US012752646B2

(12) United States Patent
Jeong et al.

(10) Patent No.: US 12,752,646 B2
(45) Date of Patent: Oct. 6, 2026

(54) CHARGING CONNECTION DEVICE FOR DRONE

(71) Applicant: ARGOSDYNE CO., LTD., Gyeonggi-do (KR)

(72) Inventors: Seung Ho Jeong, Seongnam-si (KR); Seung Hyun Jung, Seongnam-si (KR)

(73) Assignee: ARGOSDYNE CO., LTD., Yongin-si (KR)

( * ) Notice: Subject to any disclaimer, the term of this patent is extended or adjusted under 35 U.S.C. 154(b) by 855 days.

(21) Appl. No.: 18/021,168

(22) PCT Filed: Nov. 18, 2020

(86) PCT No.: PCT/KR2020/016214
§ 371 (c)(1),
(2) Date: Mar. 30, 2023

(87) PCT Pub. No.: WO2022/034975
PCT Pub. Date: Feb. 17, 2022

(65) Prior Publication Data

US 2023/0219434 A1 Jul. 13, 2023

(30) Foreign Application Priority Data

Aug. 14, 2020 (KR) ........................ 10-2020-0102212

(51) Int. Cl.
*B60L 53/16* (2019.01)
*B60L 53/35* (2019.01)
*B64U 50/37* (2023.01)
*H01R 13/631* (2006.01)
*B64U 101/30* (2023.01)
*B64U 101/45* (2023.01)
*B64U 101/64* (2023.01)

(52) U.S. Cl.
CPC ............... *B60L 53/16* (2019.02); *B60L 53/35* (2019.02); *B64U 50/37* (2023.01); *H01R 13/631* (2013.01); *B60L 2200/10* (2013.01); *B64U 2101/30* (2023.01); *B64U 2101/45* (2023.01); *B64U 2101/64* (2023.01); *H01R 2201/26* (2013.01)

(58) Field of Classification Search
CPC ........ B60L 53/16; B60L 53/35; H01R 13/631
See application file for complete search history.

(56) References Cited

U.S. PATENT DOCUMENTS

2016/0347450 A1* 12/2016 Raniere .................. B64U 50/35
2019/0077505 A1* 3/2019 Akens .................... B64U 50/34
2019/0344679 A1 11/2019 Miller et al.

FOREIGN PATENT DOCUMENTS

JP 2019-214256 A 12/2019
KR 10-2016-0015713 A 2/2016
KR 10-1732713 B1 5/2017

(Continued)

*Primary Examiner* — Robert Grant
(74) *Attorney, Agent, or Firm* — Bridgeway IP Law Group, PLLC; Sang Ho Lee; Hyun Woo Shin

(57) ABSTRACT

A charging connection device for a drone according to an embodiment of the present invention comprises: a core installed on a drone; an electrically conductive member positioned on the outer contour of the core and formed of a conductive material; and a tension unit positioned between the core and the electrically conductive member and absorbing shock transmitted from the electrically conductive member.

4 Claims, 7 Drawing Sheets

(56) References Cited

FOREIGN PATENT DOCUMENTS

| | | | |
|---|---|---|---|
| KR | 10-1805440 | B1 | 12/2017 |
| KR | 10-2019-0087910 | A | 7/2019 |
| KR | 10-2002064 | B1 | 7/2019 |
| KR | 10-2019-0125130 | A | 11/2019 |
| KR | 10-2066345 | B1 | 1/2020 |

* cited by examiner

CHARGING CONNECTION DEVICE FOR DRONE

FIELD OF INVENTION

The present invention relates to a charging connection device for a drone, which can charge a battery while the drone is ready for takeoff or in a landed state.

BACKGROUND OF INVENTION

In general, a drone is provided with a built-in battery, a plurality of motors and propellers, and may include a control unit for controlling the drone mounted thereon.

Further, the drone may be equipped with an additional device according to the purpose of use. The additional device may be, for example, a pesticide spreader, a camera, an object throwing device, and the like.

That is, the drone may perform pesticide spraying, image capturing or reconnaissance, transport of goods, and the like, according to functions of such additional device.

Whatever the purpose of using a drone, battery power is required to achieve desired purposes of using the drone.

Conventionally, when the battery of a drone is exhausted, the drone is duly returned for replacing the battery and then using the drone again.

However, in order to replace the battery of the drone, additional components such as a cabinet or clamps are required to mount the battery and such additional components increase a volume and weight of the drone, which may adversely affect extension of a flight time of the drone.

On the other hand, as another technology known in the art, the drone can be landed on a specific device, for example, a station and then supplied with powder to charge the battery by connecting some components of the drone as well as the station with a current carrying means.

In order to land the drone at a correct location on the station, precise control is required. Further, in order to prevent the drone from dropping suddenly, it must perform hovering flight to maintain a height for a while just before landing.

Alternatively, in order not to cause an impact when the drone is landed, it is necessary to control and reduce the landing speed of the drone.

In other words, according to the conventionally known technology, the drone speed must be reduced to mitigate the impact possibly occurring when the drone is landed. Even the drone should try to perform hovering flight for a while at a specific height above the landing point, however, such a landing try as described above entails problems in that landing time is delayed and battery consumption is excessively wasted.

PRIOR ART LITERATURE (Patent Document 1) KR10-1732713 B1
(Patent Document 2) KR10-1805440 B1
(Patent Document 3) KR10-2019-0125130 A
(Patent Document 4) KR10-2002064 B1

SUMMARY OF INVENTION

Technical Problem to be Solved

Therefore, for a technical task to be achieved by the present invention, an object of the present invention is to provide a charging connection device for a drone ("drone charging connection device"), which enables: a battery to be charged while a drone is ready for takeoff and landing; and the drone to land at a desired charging position without precisely controlling a landing location when landing is attempted.

Another object of the present invention is to provide a drone charging connection device, which enables the drone to safely land even though landing is attempted without excessively reducing a drone speed in the sky above the exact landing point when attempting to land the drone.

A still further object of the present invention is to provide a drone charging connection device, in which a contact point for power connection is pressed by the weight of the drone itself, resulting in a more complete form of contact point.

Technical Solution

As a means for achieving the above object, a drone charging connection device according to an embodiment of the present invention may include: a core 20 provided in a drone 10; a current carrying member 30 disposed on an outer periphery of the core 20 and formed of an electrically conductive material; and a tension unit 40 disposed between the core 20 and the current carrying member 30 to absorb shock or impact transferred from the current carrying member 30.

Further, with regard to the drone charging connection device according to an embodiment of the present invention, the tension unit 40 may be provided in plurality and arranged in a circular form around the outer periphery of the core 20.

Further, with regard to the drone charging connection device according to an embodiment of the present invention, it may further include a mounting hole 22, which is provided in plurality corresponding to the number of the tension units 40 and may be formed concavely on an outer surface of the core 20 in order to align the tension units 40 thereon.

Further, with regard to the drone charging connection device according to an embodiment of the present invention, with respect to a horizontal line (that is, cross line) (CL), some among the plurality of tension units 40, which are located below the cross line CL passing through the center of the core 20, may be subjected to compressive stress so as to transfer the weight of the drone 10 to the current carrying member 30.

Still further, with regard to the drone charging connection device according to an embodiment of the present invention, the current carrying member 30 may be provided in plurality, which are sequentially disposed on a single core 20.

The details of other embodiments are included in the detailed description and drawings.

Effects of Invention

The drone charging connection device according to the embodiments of the present invention as described above may enable a battery to be charged while a drone is ready for takeoff and landing, precisely control a landing location when landing is attempted, and safely land the drone at a desired charging position even with roughly controlling.

Further, the drone charging connection device according to the embodiments of the present invention may allow the drone to attempt landing without excessively reducing a speed in the sky above the exact landing point when landing is attempted.

Further, the drone charging connection device according to the embodiments of the present invention may allow a contact point for power connection to be pressed by the weight of the drone itself, resulting in a more complete form of contact point.

BEST MODE FOR CARRYING INVENTION

Figure 1:
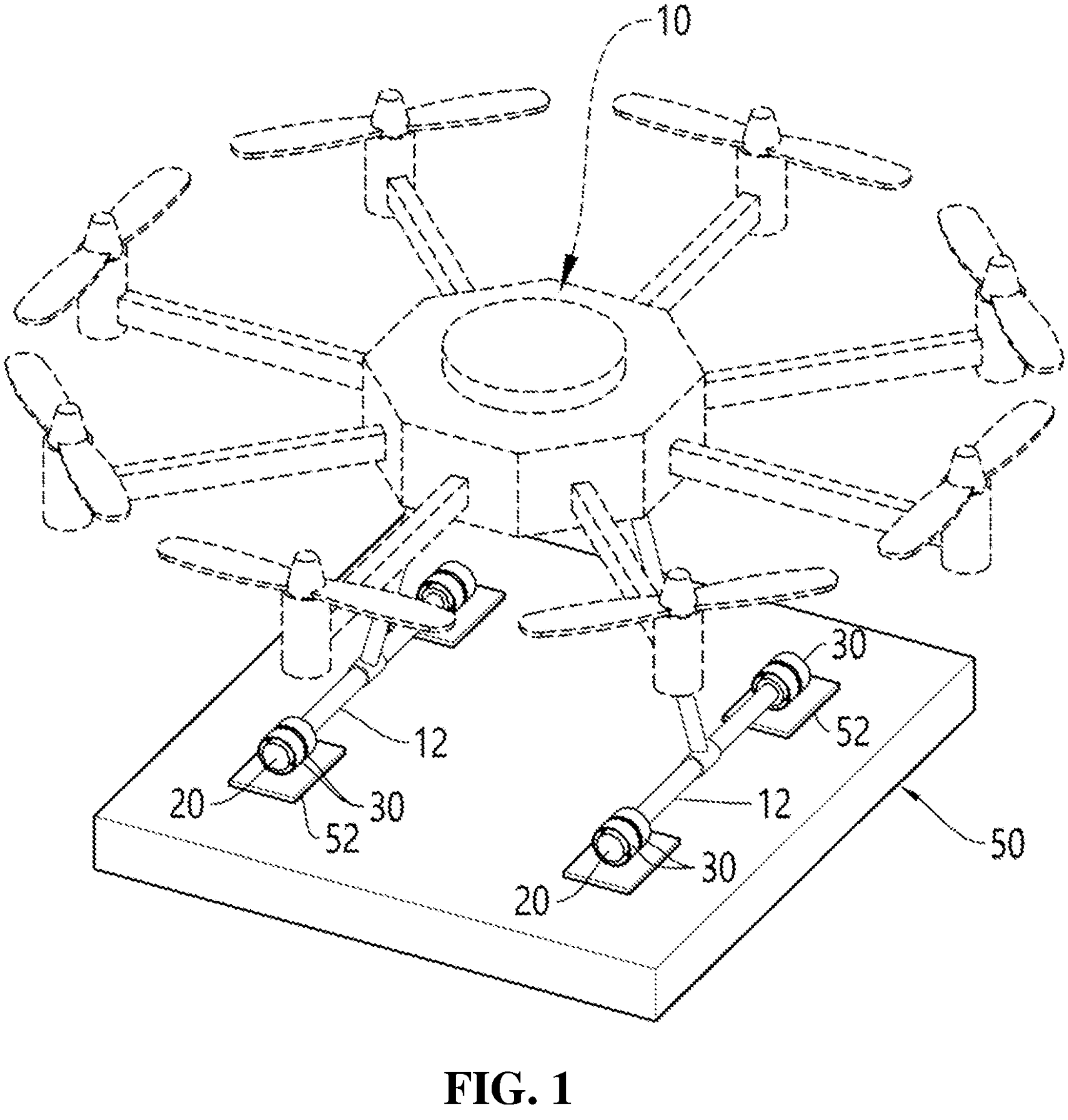
FIG. 1 is a view illustrating an example in which a drone charging connection device according to an embodiment of the present invention is installed in a drone.

Advantages and features of the present invention, and methods for achieving the same will become apparent with reference to the embodiments described below in detail in conjunction with the accompanying drawings.

Hereinafter, embodiments of the present invention will be described in detail with reference to the accompanying drawings. It should be understood that the embodiments described below are illustratively shown to aid understanding of the present invention, and that the present invention may be implemented with various modifications different from the embodiments described herein. However, when it is determined that a detailed description of related known functions or components may unnecessarily obscure the gist of the present invention while describing the present invention, the detailed description and specific illustration thereof will be omitted. Further, the accompanying drawings are not drawn to scale, but the size of some components may be exaggerated in order to help the understanding of the invention.

Meanwhile, terms such as "first" and "second" may be used to describe various components, but the components should not be limited by the terms. In fact, these terms are used only for the purpose of distinguishing one component from another. For example, without departing from the scope of the present invention, a first component may be referred to as a second component, and similarly, a second component may also be referred to as a first component.

On the other hand, the terms described below are terms set in consideration of functions in the present invention, which may vary depending on the intention or custom of the producer, whereby the definition should be made based on the content throughout this specification.

Like reference numerals refer to like elements throughout.

[Description of reference numerals]

| | |
|---|---|
| 10: Drone | 12: Landing skid |
| 14: Wire | |
| 20: Core | 22: Mounting hole |
| 30: Current carrying member | |
| 40: Tension unit | 42: Head |
| 44: Coil | |
| 50: Station | 52: Current carrying plate |

DETAILED DESCRIPTION OF PREFERRED EMBODIMENTS OF INVENTION

Figure 6:
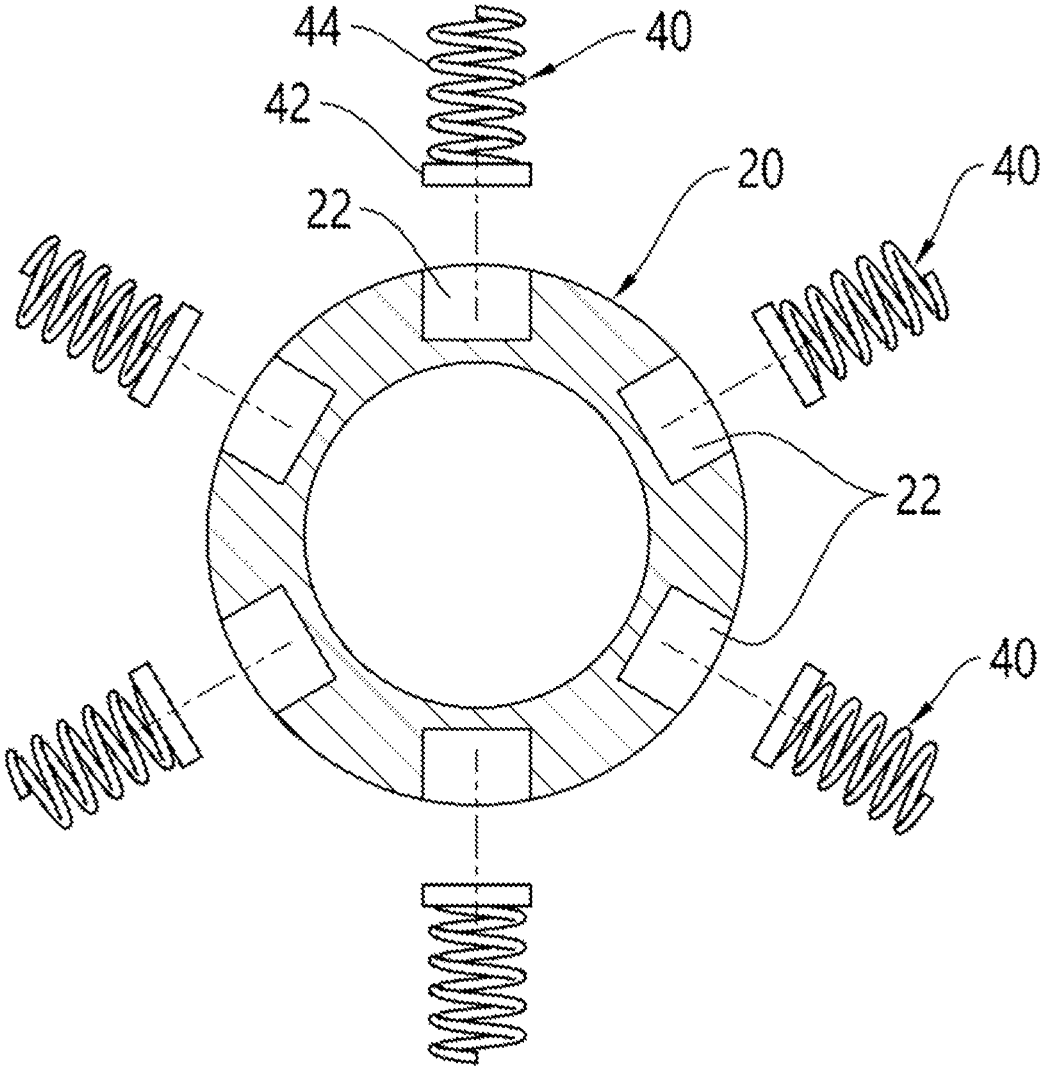
FIG. 6 is a view illustrating the configuration of a tension unit in the drone charging connection device according to an embodiment of the present invention.
Figure 7:
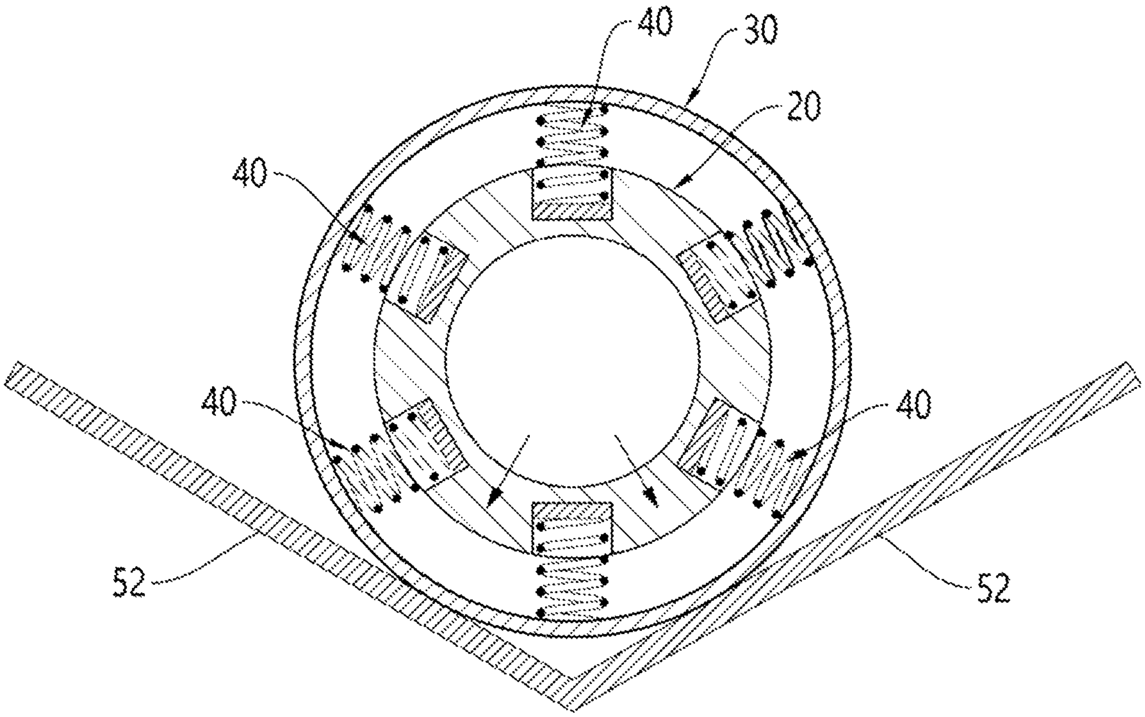
FIG. 7 is a view illustrating the operation of the drone charging connection device according to an embodiment of the present invention.

Hereinafter, a charging connection device for a drone according to an embodiment of the present invention will be described with reference to FIGS. 1 to 7. FIG. 1 is a view illustrating an example in which a drone charging connection device according to an embodiment of the present invention is installed in a drone; FIGS. 2 to 5 are views illustrating the configuration of the drone charging connection device according to an embodiment of the present invention, specifically including an assembly view, a side cross-sectional view in an assembled state, a front cross-sectional view in an assembled state, and an exploded view; FIG. 6 is a view illustrating the configuration of a tension unit in the drone charging connection device according to an embodiment of the present invention; and FIG. 7 is a view illustrating the operation of the drone charging connection device according to an embodiment of the present invention.

The drone charging connection device according to an embodiment of the present invention may include a core 20, a current carrying member 30 and a tension unit 40.

The core 20 may be provided on a drone 10, and more specifically, may be mounted on a landing skid 12 of the drone 10.

That is, the core 20 may be mounted on a component that is grounded when the drone 10 lands.

In the embodiment of the present invention, the core 20 may be formed in a cylindrical shape, but is not limited thereto, and the shape may vary depending on a shape of the landing skid 12.

The current carrying member 30 may be disposed on an outer periphery of the core 20 and may be made of an electrically conductive material. The current carrying member 30 may be made of copper, aluminum, copper alloy, aluminum alloy, or the like, so that electricity can easily pass while maintaining rigidity.

Figure 2:
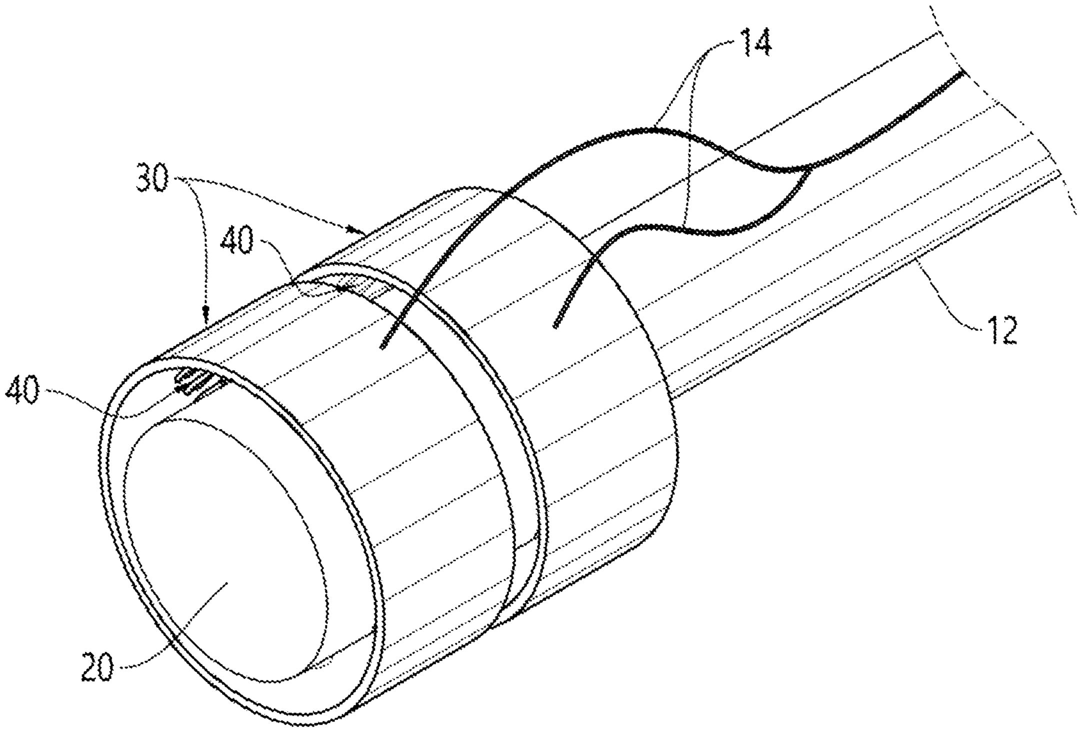
FIGS. 2 to 5 are views illustrating the configuration of the drone charging connection device according to an embodiment of the present invention, specifically including an assembly view, a side cross-sectional view in an assembled state, a front cross-sectional view in an assembled state, and an exploded view.

Meanwhile, as shown in FIG. 2, an electric wire 14 may be connected to one side of the current carrying member 30, and the electric wire 14 may be connected to a battery charging circuit of the drone 10.

The tension unit 40 may be disposed between the core 20 and the current carrying member 30, and may absorb an impact transferred from the current carrying member 30.

In more detail, when attempting to land the drone 10, the current carrying member 30 may be firstly grounded and, at this time, an impact possibly occurring due to a descending speed of the drone 10 may be absorbed by the tension unit 40.

On the other hand, the drone 10 may land at a station 50 and may be ready for takeoff. The station 50 may be provided with a current carrying plate 52 as shown in FIG. 1.

That is, with regard to the drone charging connection device according to an embodiment of the present invention, when the drone 10 lands on the station 50 or is ready for takeoff, the current carrying member 30 may be placed on the current carrying plate 52, and thus, a circuit of the current carrying member 30 and the current carrying plate 52 may be closed.

Therefore, with regard to the drone charging connection device according to an embodiment of the present invention, power may be supplied from the current carrying plate 52 to the current carrying member 30.

That is, the drone charging connection device according to an embodiment of the present invention may allow a battery to be charged while the drone 10 is ready for takeoff;

precisely control a landing location when landing is attempted; and safely land the drone at a desired charging position even with roughly controlling.

Further, the drone charging connection device according to an embodiment of the present invention may allow the drone 10 to attempt landing without excessively reducing a speed in the sky above the landing point when landing is attempted.

Further, with regard to the drone charging connection device according to an embodiment of the present invention, a contact point for power connection may be pressed by the weight of the drone itself, resulting in a more complete form of contact point, so that spark splashing due to a contact failure during charging can be prevented.

Figure 4:
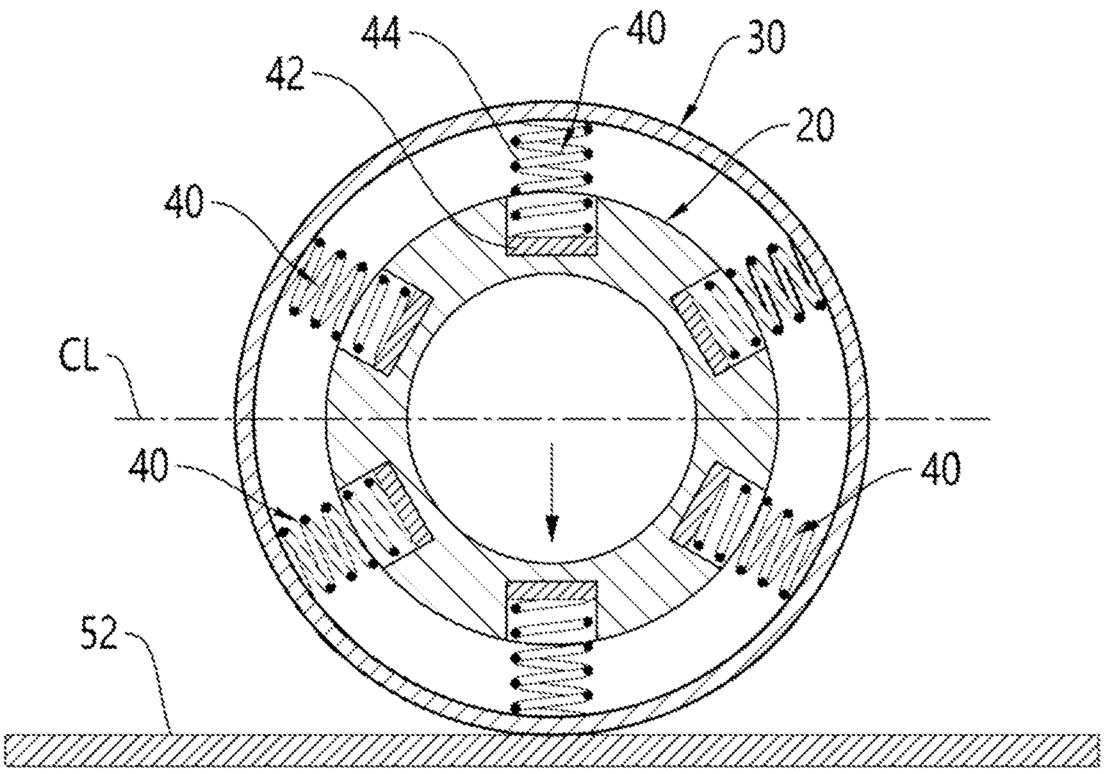
Figure 5:
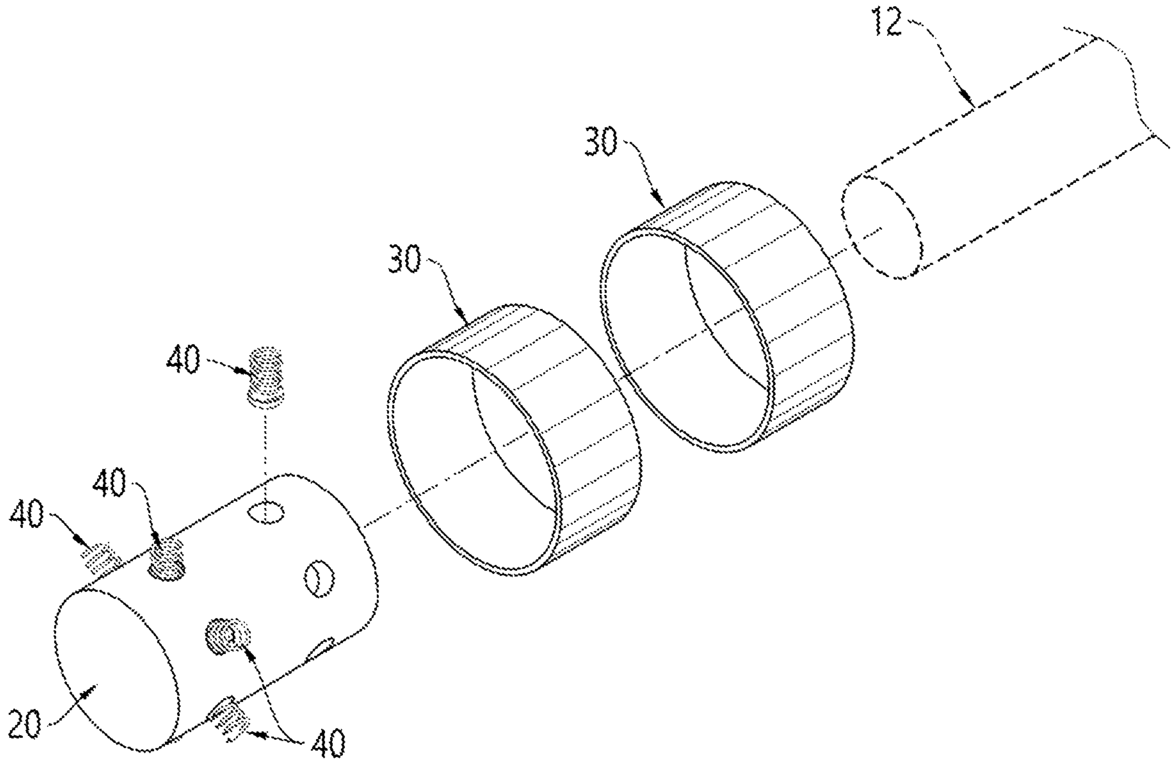

Further, as shown in FIGS. 4, 6 and 7, the tension unit 40 may be provided in plurality, and may be disposed in a circular form around an outer periphery of the core 20.

Accordingly, when an impact is applied to the current carrying member 30 from the outside, it is possible to absorb the impact in all directions regardless of which direction the impact is applied from.

In addition, as shown in FIG. 6, mounting holes 22 may be formed concavely on an outer surface of the core 20 in a number corresponding to the number of the tension units 40 so as to align the tension units 40 thereon.

That is, the plurality of tension units 40 may be disposed at predetermined positions as intended by the designer, and it is possible to inhibit the tension units from arbitrarily departing from the predetermined positions.

Further, the tension unit 40 may be provided in a form in which a coil 44 is provided on one side of the head 42 as shown in FIG. 4 and, when the head 42 is placed in the mounting hole 22, it may contribute to alignment of a posture of the coil 44. As a result, the coil 44 may maintain the posture in contact with the current carrying member 30 in a normal line. Further, a load applied to the landing skid 12 when the drone 10 is landing may be delivered to a direction in which the coil 44 contracts, thereby more perfectly contributing to shock absorption or shock mitigation.

Further, the head 42 may be fixed while being press-fitted into the mounting hole 22, or may be fixed with an adhesive.

Further, among the plurality of tension units 40, as shown in FIG. 4, with respect to the cross line CL passing through the center of the core 20, the tension units 40 below the cross line CL may be subjected to compressive stress so as to transfer the weight of the drone 10 to the current carrying member 30.

That is, the weight of the drone 10 may entirely contribute to keeping the current carrying member 30 and the current carrying plate 52 in close contact, thereby more reliably preventing contact failure.

Further, as shown in FIG. 7, when the current carrying plate 52 is provided in a concave shape rather than a flat shape, the current carrying member 30 may contact the current carrying plate 52 at two points. Further, due to the weight of the drone 10, the current carrying member 30 may be pressed to the current carrying plate 52 through the plurality of tension units 40 disposed below the cross line CL, thereby preventing a contact failure problem.

Figure 3:
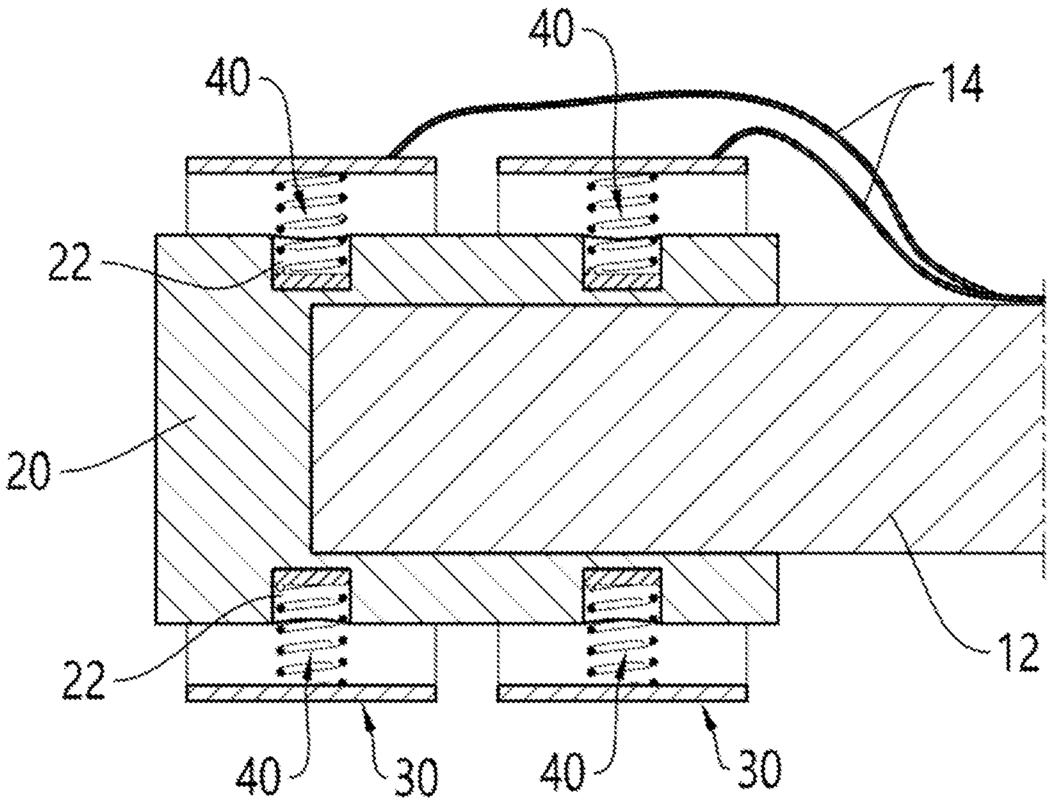

A plurality of the current carrying members 30 may be provided as shown in FIGS. 2 and 3, and may be sequentially disposed on a single core 20. That is, one current carrying member 30 and another current carrying member 30 adjacent thereto may move physically independently to each other.

Accordingly, even if one of the current carrying members 30 is deformed for an unknown reason, another current carrying member 30 still may contact the current carrying plate 52.

That is, the drone charging connection device according to an embodiment of the present invention can prevent charging failure when charging is attempted.

Although embodiments of the present invention have been described above with reference to the accompanying drawings, those skilled in the art to which the present invention pertains will understand that the present invention may be embodied in other specific forms without changing the technical spirit or essential characteristics thereof.

Therefore, the embodiments described above are to be understood as illustrative and not restrictive in all respects, and the scope of the present invention is indicated by the appended claims, and all changes or modifications which are derived from the meaning and scope of the claims and their equivalents should be construed as being included in the scope of the present invention.

INDUSTRIAL APPLICABILITY

The charging connection device for a drone according to an embodiment of the present invention may be used to charge a battery while the drone is ready for takeoff.

The invention claimed is:

1. A charging connection device for a drone, comprising:

a core provided in a drone;

a current carrying member disposed on an outer periphery of the core and formed of an electrically conductive material;

a tension unit disposed between the core and the current carrying member to absorb shock or impact transferred from the current carrying member, and a mounting hole, which is provided in plurality corresponding to a number of the tension units and is formed concavely on an outer surface of the core in order to align the tension units thereon, wherein the tension unit is provided in plurality and arranged in a circular form around the outer periphery of the core.

2. The device according to claim 1, wherein, with respect to a cross line passing through a center of the core, some among the plurality of tension units located below the cross line are subjected to compressive stress so as to transfer a weight of the drone to the current carrying member.

3. The device according to claim 1, wherein the current carrying member is provided in plurality, which are sequentially disposed on a single core.

4. The device according to claim 2, wherein the current carrying member is provided in plurality, which are sequentially disposed on a single core.

* * * * *